United States Patent Office 3,393,921
Patented July 23, 1968

3,393,921
VEHICLE SUSPENSION ASSEMBLIES
Douglas Bryan Wilkins, and John Robert Rees, Tyseley, Birmingham, England, assignors to Girling Limited
Filed Sept. 21, 1966, Ser. No. 580,946
Claims priority, application Great Britain, Sept. 27, 1965, 41,049/65
5 Claims. (Cl. 280—124)

ABSTRACT OF THE DISCLOSURE

The invention relates to vehicle suspension assemblies in which fluid under pressure can be pumped between a reservoir and a vehicle suspension strut or struts in either direction. The main feature of the invention resides in the use of a pressure responsive switch for controlling operation of the pump, the switch being responsive to a pressure differential between the strut and the reservoir. Thus, the switch can be arranged to stop the pump at a predetermined pressure differential, without regard to the absolute pressure at either the strut or the reservoir, with the result that standardized strut and reservoir volumes can be used for different sizes of vehicles. The switch preferably includes a diaphragm or other pressure responsive element, displacement of which under the action of a predetermined pressure differential operates a simple switch controlling operation of the motor.

This invention relates to vehicle suspensions and in particular to a vehicle-suspension assembly for supporting at least part of sprung weight of the vehicle.

We have previously proposed a vehicle suspension system comprising at least one telescopic strut for connection between sprung and unsprung vehicle parts, a reservoir connected to the strut, and a pump selectively operable to displace fluid in either direction between the reservoir and the strut.

The present invention is concerned with improvements in a system of the same character, and resides broadly in the provision of a vehicle suspension assembly comprising at least one suspension strut connected between sprung and unsprung vehicle parts, a fluid reservoir, a pump operable to pump fluid in either direction between the reservoir and the strut, control means interposed in the fluid connection between the strut and the reservoir for selecting the direction in which the fluid is pumped, and a pressure-responsive switch to control the pump, said switch being responsive to a pressure differential between said strut and reservoir.

With this arrangement, the pressure responsive switch can be arranged to stop the pump at a predetermined pressure differential, without regard to the absolute pressure at either the strut or reservoir, with the result that standardised strut and reservoir volumes can be used for different sizes of vehicle.

The pressure-responsive switch may be connected directly between the strut and the reservoir, or alternatively between the inlet and the outlet of the pump, the connections being made on those sides of one-way valves in the inlet and outlet, respectively, remote from the pump.

In the former case the pressure-responsive element of the switch will be double-acting and in the latter case it will be single-acting.

Two forms of fluid-suspension system in accordance with the invention will now be described, by way of example, with reference to the accompanying drawings, in which.

Figure 1:
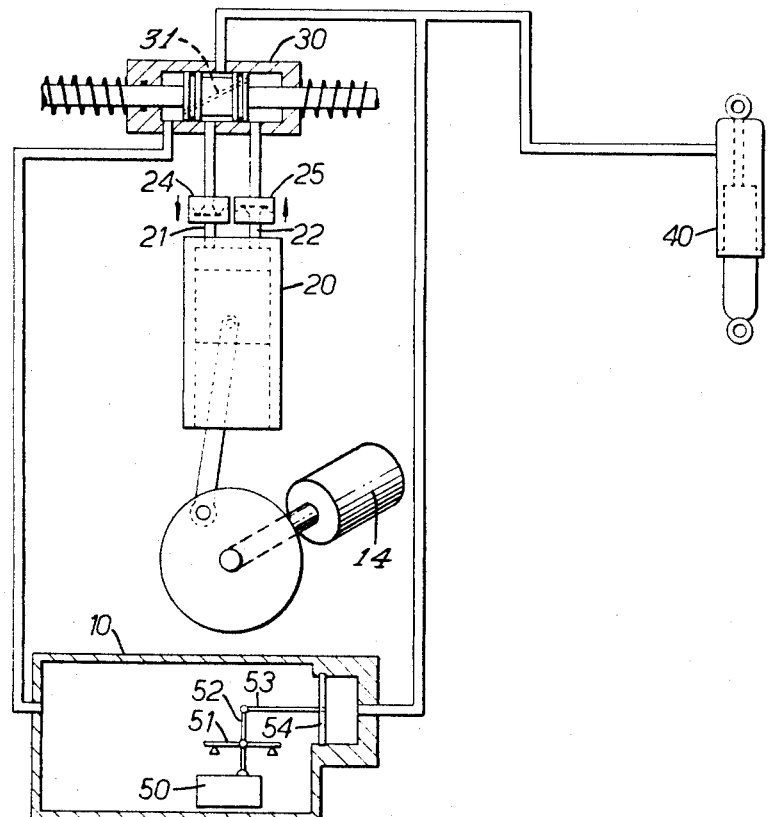
FIGURE 1 is a diagrammatic general view of the suspension system.

The vehicle-suspension system shown in FIGURE 1 comprises a compressed air reservoir 10, a pump 20 having its inlet 21 and outlet 22 connected to a solenoid operated change-over valve 30 through the intermediary of one-way valves 24 and 25. The change-over valve 30 is connected on the one hand to the reservoir, and on the other hand to the air space of a combined strut and damper unit 40 which is connected between sprung and unsprung vehicle parts, being adapted to raise the sprung part when more air is pumped into the air space and vice versa. When the pump is operating, air is pumped from the reservoir to the strut, or in the reverse direction according to the operational position of the change-over valve past the one-way valves.

A pressure-responsive switch 50 is controlled by an operating lever 51 pivoted at both ends and connected by central lug 52 to the stem 53 of a flexible diaphragm 54, which is subjected on one side to the air pressure in the strut, and on the other side to the air pressure in the reservoir, such that deflection of the diaphragm, in either direction, to a predetermined extent, due to a predetermined pressure difference across the diaphragm, will open the contacts of the switch 50 to stop the pump motor.

Operation of the change-over valve is controlled through solenoids by a dashboard mounted, manually operated, three pole switch, whose three operative positions may be designated "UP," "MID" and "DOWN." For the sake of example, the vehicle may be assumed initially to be unladen, with the change-over valve in its illustrated position (in which the pump outlet is connected to the reservoir by virtue of a passageway 31 through the movable member of the changeover valve 30, which passageway connects opposite ends of the changeover valve) and the pump at rest due to the reservoir pressure being higher than the strut pressure by a predetermined amount. If a load is now added to the sprung part of the vehicle, the strut will be compressed and to regain the level position, the manual switch is shifted to select "UP," and as it passes the "MID" position the solenoid is energised to move the change-over valve to its opposite position, thereby allowing the pressures in the strut and the reservoir to equalise. In its "UP" position, the switch completes a circuit for the pump motor, so that air is pumped from the reservoir to the strut. When the desired pressure differential is attained, the pressure-responsive switch acts to cut out the pump motor, and the pressure difference is held by the change-over valve.

If a part of the load is then removed, the vehicle body will rise too high and the manual switch is shifted to its "MID" position which causes the change-over valve to be reversed again (to its illustrated position), but without energising the pump, so that the reservoir and strut pressure can be equalised.

If the remaining load is removed, the manual switch can be shifted to its "DOWN" position. Operation of the change-over valve is not affected, but the pump is energised to pump air from the strut to the reservoir until the pump motor is cut out by the pressure-responsive switch when the predetermined pressure differential is established, thereby returning the system to the initially assumed unladen condition, in which the high pressure in the reservoir is held by the change-over valve.

According to a possible modification, the connections from the opposite sides of the pressure diaphragm are taken not to the reservoir and the strut, but to the connections between the inlet and outlet one-way valves, respectively, and the change-over valve. In this case the diaphragm is single acting in that one side is always subjected to the higher pressure which works against the action of the lower pressure and if necessary a return spring or other biasing means to open the contacts of the pressure-responsive switch.

With the above described arrangements, the use of a switch responsive to the actual pressure difference between the strut and the reservoir renders it unnecessary for the strut and reservoir volumes to be equal in order to ensure correct absolute pressures which may be necessary for operation of a pressure-responsive switch or switches operated only by those absolute pressures.

Figure 2:
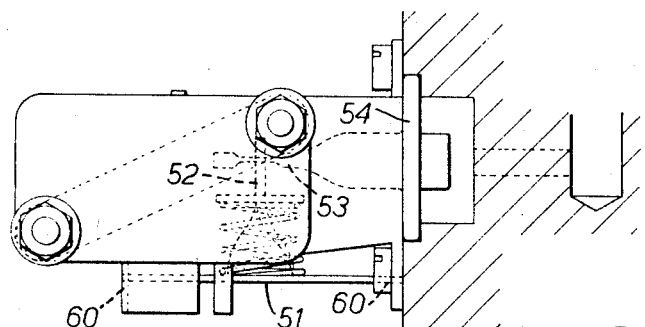
FIGURES 2, 3 and 4 are scrap views showing three different arrangements for the pressure responsive switch.

The pressure-responsive switch means shown in FIGURE 2 comprise pressure-responsive element in the form of a diaphragm 54 having a stem 53, which passes through a lug 52 projecting upwardly from the junction of a T-shaped lever or plate 51. The ends 60 of the cross pieces of the T are pivotally received in recesses which permit the plate to rock, and the upright of the T engages the button of the pressure-responsive switch 50 (not shown in FIGURE 2). When the diaphragm 52 moves a predetermined minimum distance to either side of its position of equilibrium, the stem 53 first takes up some lost motion, then engages the lug 52 and rocks the plate 51, operating the switch actuating button to open the switch and thereby de-energise the motor 14.

The pressure-responsive diaphragm could alternatively be arranged, to be subjected to the pressures in the connections between the change-over valve 30 and the one-way valves 24 and 25, respectively. In this case one side of the diaphragm will always be subjected to the higher pressure.

Many variations and modifications will, of course, be possible within the scope of the invention. For example, the change-over valve could be arranged to be responsive to reversal of the pump motor instead of being solenoid controlled. Furthermore, the control switch need not be on the dashboard but could be placed elsewhere as required.

Figure 3:
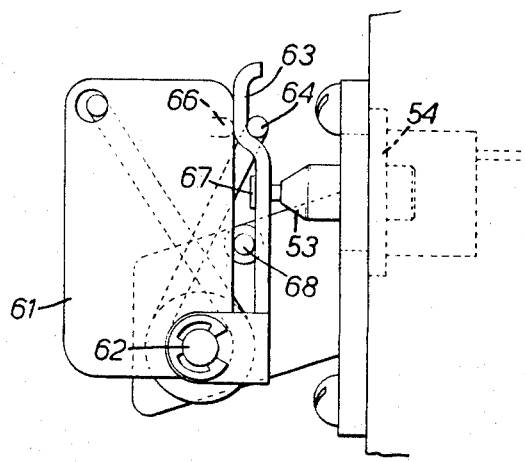
Figure 4:
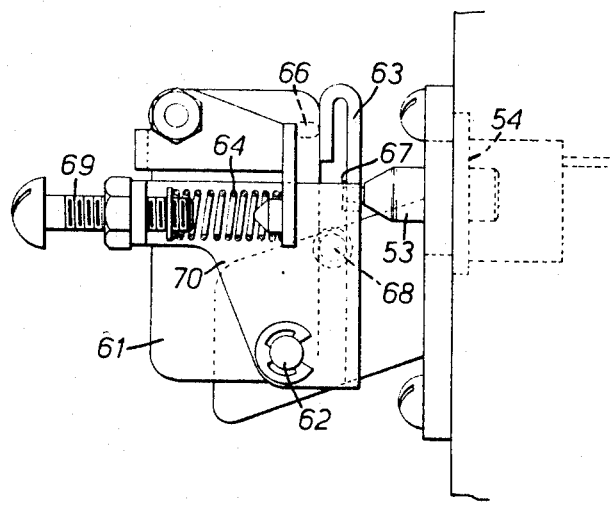
Figure 5:
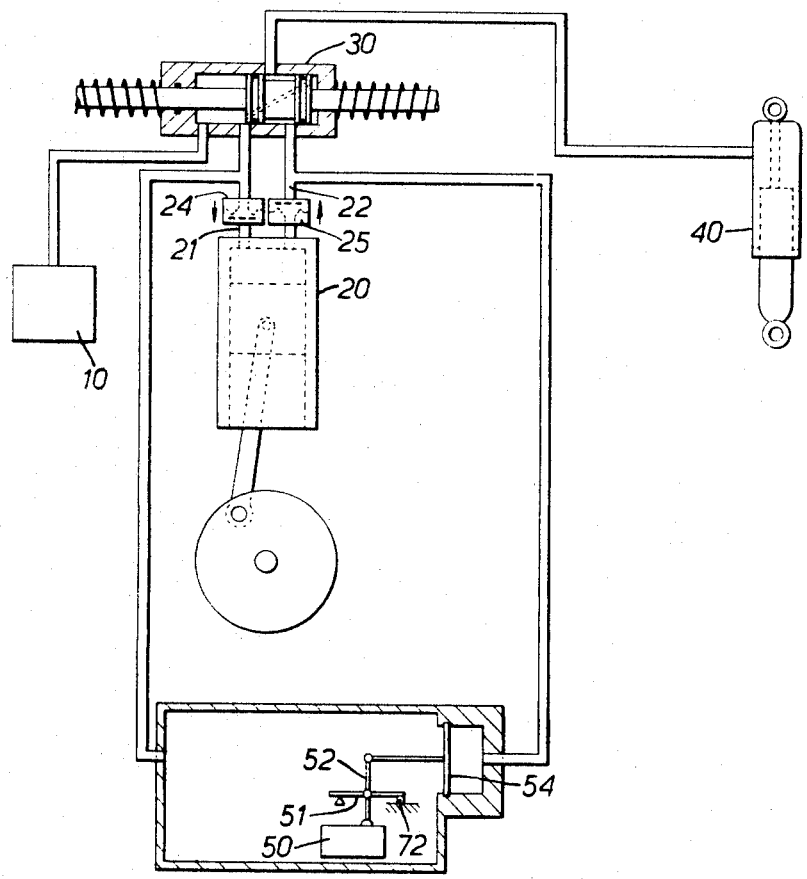
FIGURE 5 is a diagrammatic general view of a second form of system.

Other modifications are illustrated in FIGURES 3 and 4, which show two alternative switch arrangements which could replace that shown in FIGURE 5.

In each case, the switch body 61 is pivotally mounted upon a transverse shaft 62, and a switch operating arm 63 is urged against the body by a spring 64 in order to hold the switch button 66 depressed. The stem 53 of the diaphragm 54 has an enlarged head 67 engaging between the body 61 and arm 63. When the pressures on either side of the diaphragm 54 are substantially balanced, the parts assume the positions shown in FIGURES 5 and 6, and the switch is held "on." If the pressure difference becomes great enough, however, the diaphragm and stem will move to the left or right accordingly, and the head 67 will either push the body 61 away from the arms 63 while the arm is held by a stop 68, or will pull the arm away from the body while the body is held by the stop.

The differences between the arrangements of FIGURES 3 and 4 are only differences of detail, the main one being that in FIGURE 3 the spring 64 is effectively a tension spring, whose force can be adjusted by removing it and resetting, while in FIGURE 4 the spring 64 is a coil compression spring whose force is adjustable by means of an adjuster screw 69 mounted on a bracket 70 which is fast with the arm 63.

Both arrangements are simpler to manufacture and mount than that shown in FIGURE 2.

FIGURE 5 shows a system in which the respective sides of the pressure-responsive element 54 are connected to the inlet 21 and outlet 22 of the pump 20. A spring (not shown) urges the lever 51 in one direction against an abutment 72, normally holding closed switch contact 50, but movement of the diaphragm to the left, against the action of the spring, will open the contacts when the pump outlet pressure is sufficient to overcome the combined opposing effect of the inlet pressure and the spring.

We claim:
1. A vehicle-suspension assembly comprising at least one suspension strut connected between sprung and unsprung vehicle parts, a fluid reservoir, a fluid pump, fluid conduit means between said strut, reservoir and pump, said pump being operable to pump fluid in either direction between said reservoir and said strut, control means interposed in said conduit means operable to select the direction in which fluid is pumped between said strut and said reservoir, and pressure-responsive switch means for controlling operation of said pump, said switch means being responsive to a pressure differential between said strut and said reservoir.

2. Assembly as claimed in claim 1, wherein said switch means includes a double acting pressure-responsive element subjected on one side to the pressure in said strut and on the other side to the pressure in said pump.

3. Assembly as claimed in claim 2 wherein said switch means further includes a lever connected to said element, means mounting said lever for pivotal movement about either end thereof, and a switch actuating member engageable by said lever.

4. Assembly as claimed in claim 2, wherein said switch means further includes a movably mounted switch body, a switch actuating member, a resiliently biassed member normally engaging and holding said actuating member in one operative position, and means connecting said pressure responsive element to said body and said resiliently biassed member and responsive to a predetermined displacement in either direction of said pressure responsive element to effect separation of said actuating member and said resiliently biassed element sufficient to cause said actuating member to take up a second operative condition.

5. Assembly as claimed in claim 1, wherein said pump has an inlet and an outlet conduit, and a one-way valve in each said conduit, and said switch means includes a single acting pressure responsive element connected to said respective conduits beyond said valves from said pump.

References Cited

UNITED STATES PATENTS

| | | | |
|---|---|---|---|
| 2,885,202 | 5/1959 | Trumper | 280—24 |
| 2,895,745 | 7/1959 | Brueder | 280—124 |
| 3,181,877 | 5/1965 | McHenry | 280—6 |

BENJAMIN HERSH, *Primary Examiner.*

L. D. MORRIS, *Assistant Examiner.*